United States Patent
Nihei et al.

(10) Patent No.: US 8,315,735 B2
(45) Date of Patent: Nov. 20, 2012

(54) PRODUCTION SYSTEM HAVING COOPERATING PROCESS AREA BETWEEN HUMAN AND ROBOT

(75) Inventors: Ryo Nihei, Yamanashi (JP); Shinsuke Sakakibara, Yamanashi (JP); Kazunori Ban, Yamanashi (JP); Masahiro Morioka, Yamanashi (JP); Satoshi Adachi, Yamanashi (JP); Shouta Takizawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 150 days.

(21) Appl. No.: 12/694,201

(22) Filed: Jan. 26, 2010

(65) Prior Publication Data

US 2010/0191372 A1 Jul. 29, 2010

(30) Foreign Application Priority Data

Jan. 26, 2009 (JP) .................. 2009-014672

(51) Int. Cl.
*G06F 19/00* (2011.01)
(52) U.S. Cl. ..... 700/245; 700/79; 700/255; 318/568.11; 318/568.12; 318/568.16; 318/568.18; 318/568.24
(58) Field of Classification Search ............ 700/245, 700/79, 247, 250, 255; 348/152; 318/568.11, 318/568.12, 568.16, 568.18, 568.24
See application file for complete search history.

(56) References Cited

U.S. PATENT DOCUMENTS

| | | | | |
|---|---|---|---|---|
| 4,482,968 A | * | 11/1984 | Inaba et al. | 318/568.22 |
| 4,884,674 A | * | 12/1989 | Head, III | 198/341.01 |
| 5,758,298 A | * | 5/1998 | Guldner | 701/23 |
| 5,956,465 A | * | 9/1999 | Takagi et al. | 700/255 |
| 6,076,652 A | * | 6/2000 | Head, III | 198/341.07 |

(Continued)

FOREIGN PATENT DOCUMENTS

DE 102004043514 A1 3/2006

(Continued)

OTHER PUBLICATIONS

Ogure et al., Risk Management Simulator for Low-Powered Human-Collaborative Industrial Robot, Oct. 2009, The 2009 IEEE/RSJ International Conference on Intelligent Robots and Systems, St. Louis, USA, pp. 49-54.*

(Continued)

*Primary Examiner* — Khoi Tran
*Assistant Examiner* — Jamie Figueroa
(74) *Attorney, Agent, or Firm* — Lowe Hauptman Ham & Berner, LLP (57) ABSTRACT

A production system in which a human and a robot may simultaneously perform a cooperative task in the same area while ensuring human's safety. A robot is positioned at one side of a working table, and an operator is positioned at the other side of the working table. The reachable area of the operator is limited by the working table. An area of the working table is divided into an area where only the operator may perform a task, an area where only the robot may perform a task, and an area where both the operator and the robot may enter. In a cooperation mode, the maximum movement speed of a component of the robot is limited lower than when the component of the robot is outside the cooperative task area, and, the motion of the robot is limited so that the robot does not enter a robot entry-prohibited area.

9 Claims, 8 Drawing Sheets

U.S. PATENT DOCUMENTS

| | | | | |
|---|---|---|---|---|
| 7,768,549 | B2 * | 8/2010 | Cofer | 348/152 |
| 7,778,732 | B2 * | 8/2010 | Adachi et al. | 700/245 |
| 7,783,386 | B2 * | 8/2010 | Merte et al. | 700/255 |
| 2002/0186299 | A1 * | 12/2002 | Cofer | 348/152 |
| 2003/0137219 | A1 * | 7/2003 | Heiligensetzer et al. | 310/328 |
| 2004/0148039 | A1 * | 7/2004 | Farchmin et al. | 700/79 |
| 2006/0049939 | A1 | 3/2006 | Haberer et al. | |
| 2008/0021597 | A1 * | 1/2008 | Merte et al. | 700/255 |
| 2008/0269949 | A1 * | 10/2008 | Norman et al. | 700/248 |
| 2009/0271036 | A1 | 10/2009 | Kock et al. | |
| 2010/0179690 | A1 | 7/2010 | Matthias et al. | |
| 2010/0198365 | A1 * | 8/2010 | Kawabata et al. | 700/12 |

FOREIGN PATENT DOCUMENTS

| | | |
|---|---|---|
| DE | 102005003827 A1 | 7/2006 |
| DE | 102005037650 A1 | 2/2007 |
| DE | 102006046759 A1 | 4/2008 |
| DE | 102007006708 A1 | 8/2008 |
| DE | 102007028390 A1 | 12/2008 |
| EP | 0264350 A1 | 4/1988 |
| JP | 60108285 | 6/1985 |
| JP | 64-016395 A | 1/1989 |
| JP | 8300277 | 11/1996 |
| JP | 2000-006083 A | 1/2000 |
| JP | 2001341086 | 12/2001 |
| JP | 2005014133 | 1/2005 |
| JP | 2006-43792 A | 2/2006 |
| JP | 2007-283448 A | 11/2007 |
| JP | 2007-283450 A | 11/2007 |

OTHER PUBLICATIONS

Chuan Tan et al., Safety design and development of human-robot collaboration in cellular manufacturing, Aug. 2009, 5th Annual IEEE Conference on Automation Science and Engineering, Bangalore, India, pp. 537-542.*

Etherton, John R., Safe guidelines for robotiv workstations, Mar. 1998, NIOSH Technical report publication No. 88-108, US Department of Health, pp. 1-56.*

Kruger et al., Image based 3D Surveillance for flexible Man-Robot-Cooperation, 2005, CIRP Annals- Manufacturing Technology, vol. 54, issue 1, pp. 19-22.*

Kruger et al., Cooperation of human and machines in assembly lines, 2009, Elsevier, CIRP Annals—Manufacturing Technology, vol. 58, pp. 628-646.*

Salmi et al., Man-Robot Cooperation—Assembly system integration, 2008, IFIP, vol. 260, Micro-Assembly Technologies and Applications, pp. 385-394.*

Zaeh et al., Safety Aspects in a Human-Robot Interaction Scenario- A Human Worker Is Co-operating with an Industrial Robot, 2009, Springer, FIRA 2009, CCIS 44, pp. 53-62.*

Notification of Reasons for Rejection for Japanese Application No. 2010-012494 issued May 18, 2010.

Notification of Reasons for Rejection for Japanese Application No. 2010-012494 issued Jul. 27, 2010.

German Office Action for 10 2010 005 708.8-15 dated Mar. 15, 2011.

* cited by examiner

PRODUCTION SYSTEM HAVING COOPERATING PROCESS AREA BETWEEN HUMAN AND ROBOT

RELATED APPLICATIONS

The present application claims priority from Japanese Patent Application No. 2009-14672, filed on Jan. 26, 2009, the entire contents of which are fully incorporated herein by reference.

BACKGROUND ART

1. Technical Field

The preset invention relates to a production system having a cooperating process area, by which a robot and a human can simultaneously perform a task in the same area.

2. Description of the Related Art

In the prior art, in a production system using a robot, a safety fence is normally employed in order to completely separate an operation area of the robot from the operation area of a human, whereby the robot and the human cannot simultaneously perform a task in the same area. To ensure safety, the human cannot enter the movement range of the robot when the robot is in operation.

In recent years, it has been desirable that a human can perform a setup task or the like within the movement range of the robot when the robot is in operation, in order to improve productivity or the system. In this connection, in the prior art, a stopper, for limiting motion of each axis of the robot so as to limit the movement range of the robot, is employed, whereby a protection area, which the human can enter without a risk, is obtained within the movement range of the robot.

However, if the stopper is used to limit the movement range of the robot, the protection area which the human can enter must be large, which results in the operation area of the robot being smaller. As a result, the tasks of the robot are limited, and/or the efficiency of the robot may be deteriorated. Further, since it is necessary to remove the stopper to change the protection area, the protection area cannot be changed during the robot is operated, whereby the motion of the robot may be limited even when the task of the human is not necessary. Accordingly, it is difficult to improve the productivity of the system by using the stopper.

When the human enters the movement range of the robot and the robot supplies a workpiece to the human or receives a workpiece from the human, it is necessary that the human and the robot perform such a task in the same area. In such a case, generally, the human must enter the movement range after the motion of the robot is stopped, whereby the productivity of the robot may be deteriorated.

Japanese Unexamined Patent Publication No. 2007-283450 discloses a sensor adapted to detect that a human or a robot enters an operation area where the human may perform a task, the operation area being defined within a movement range of the robot. When the sensor detects entry of the human or robot, the motion of the robot is stopped or decelerated by means of a safety controller or the like, for the safety of the human. Further, in the invention of Japanese Unexamined Patent Publication No. 2007-283450, a plurality of areas, where the human may perform a task, are defined within the movement range of the robot, and then a sensor adapted to detect that the human or the robot enters each area. In this case, the sensor may be activated or deactivated by a switching operation. Due to this, the human and the robot may alternately perform a task in the same area.

In the constitution disclosed in Japanese Unexamined Patent Publication No. 2007-283450, the human and the robot cannot simultaneously perform a task in the same area. In view of cost-consciousness in recent years, it is required that the human and the robot be able to simultaneously perform a task (or cooperative task) in the same area. In other words, in such a cooperative task, the human performs a complicated task such as assembling, and the robot supplies necessary components to the human. In such a case, the production efficiency may be improved by the cooperative task.

SUMMARY OF THE INVENTION

Therefore, an object of the present invention is to provide a production system in which a human and a robot can simultaneously perform a task in the same area (or can perform a cooperative task) while ensuring the human's safety.

In order to resolve the above problems, according to the invention, there is provided a production system comprising: a robot; a controller adapted to control the robot; an operator task area where an operator may enter and the robot cannot enter; and a cooperative task area where both the operator and the robot may enter, wherein the controller has a cooperation mode in which, when a component of the robot enters the cooperative task area, the maximum movement speed of the component of the robot is limited lower than when the component of the robot is outside the cooperative task area, or, when the operator enters the cooperative task area while the robot performs a task, the maximum movement speed of the component of the robot is limited lower than when the operator does not enter the cooperative task area, and the motion of the robot is limited so that the component of the robot does not enter a robot entry-prohibited area in the cooperative task area, the robot entry-prohibited area being defined as an area the boundary of which is separated from the peripheral object by a predetermined distance or less.

Due to the invention, the operator may take avoidance behavior when the operator performs a cooperative task or enters the cooperative task area, so as to avoid interference with the robot, since the maximum movement speed of the robot is limited. Further, by setting the robot entry-prohibited area, the operator will not get caught between the robot and the peripheral object. In addition, by limiting the maximum movement speed of the robot, the operator will not be seriously injured even if the robot collides with the operator.

The production system may further comprise a device adapted to stop the robot, in the cooperation mode, when the speed of the component of the robot exceeds a predetermined speed, or when the component of the robot enters the robot entry-prohibited area. Due to this, the robot may be prevented from moving at a relatively high speed in the cooperative task area and/or entering the robot entry-prohibited area, whereby the security of the operator may be improved.

In the production system, the controller may comprise at least one of: a first operation mode, in which the component of the robot cannot enter the cooperative task area and only the operator may perform a task in the cooperative task area; a second operation mode, in which the maximum movement speed of the component of the robot in the cooperative task area is not limited, and the robot may enter the robot entry-prohibited area and only the robot may perform a task in the cooperative task area; and a third operation mode, in which the cooperative task area is divided into an area where only the operator may perform a task and an area where only the robot may perform a task. Due to this, when the cooperative task is not necessary, the limitation of the motion of the robot is deactivated, whereby the performance of the robot may be maximized. Further, the task area for the operator may be enlarged, whereby production efficiency may be improved.

The production system may further comprise a device adapted to stop the robot, reduce the speed of the robot or command the robot to take avoidance behavior when the robot enters the cooperative task area in the first operation mode, or a device adapted to limit entering of the robot into the cooperative task area in the first operation mode.

The production system may further comprise a device adapted to stop the robot, reduce the speed of the robot or command the robot to take avoidance behavior when the operator enters the cooperative task area in the second operation mode, or a device adapted to limit entering of the operator into the cooperative task area in the second operation mode.

The production system may further comprise a device adapted to stop the robot, reduce the speed of the robot or command the robot to take avoidance behavior when the operator enters the area where only the robot may enter in the third operation mode, or a device adapted to limit entering of the operator into the area where only the robot may enter in the third operation mode.

The production system may further comprise a device adapted to stop the robot, reduce the speed of the robot or command the robot to take avoidance behavior when the robot enters the area where only the operator may enter in the third operation mode, or a device adapted to limit entering of the robot into the area where only the operator may enter in the third operation mode.

The production system may further comprise: a first sensor adapted to detect that the robot has entered the cooperative task area in the first operation mode; a second sensor adapted to detect that the operator has entered the cooperative task area in the second operation mode; and a third sensor adapted to detect that the robot has entered the area where in the cooperative task area only the operator may perform a task or that the operator has entered the area where in the cooperative task area only the robot may performs a task in the third operation mode, wherein switching of the first, second and third operation modes is carried out by switching an On/Off state of each of the first, second and third sensors.

The production system may further comprise a robot task area where the robot may enter and the operator cannot enter, wherein the maximum movement speed of the component of the robot in the robot task area is not limited.

Due to the device adapted to stop the robot, reduce the speed of the robot or command the robot to take avoidance behavior when the robot enters the cooperative task area in the second operation mode, or a device adapted to limit entering of the robot into the cooperative task area in the second operation mode; and the device adapted to stop the robot, reduce the speed of the robot or command the robot to take avoidance behavior when the operator enters the area where only the robot may enter in the third operation mode, or a device adapted to limit entering of the operator into the area where only the robot may enter in the third operation mode, the operator may be prevented from being seriously injured by the moving robot.

Due to the device adapted to stop the robot, reduce the speed of the robot or command the robot to take avoidance behavior when the robot enters the cooperative task area in the first operation mode, or a device adapted to limit entering of the robot into the cooperative task area in the first operation mode; and the device adapted to stop the robot, reduce the speed of the robot or command the robot to take avoidance behavior when the robot enters the area where only the operator may enter in the third operation mode, or a device adapted to limit entering of the robot into the area where only the operator may enter in the third operation mode, the security of the area where only the operator may enter may be improved.

BRIEF DESCRIPTION OF THE DRAWINGS

The above and other objects, features and advantages of the present invention will be made more apparent from the following description of the preferred embodiments thereof, with reference to the accompanying drawings, wherein.

DETAILED DESCRIPTION

Hereinafter, embodiments of the present invention will be explained with reference to the drawings.

First Embodiment

Figure 1:
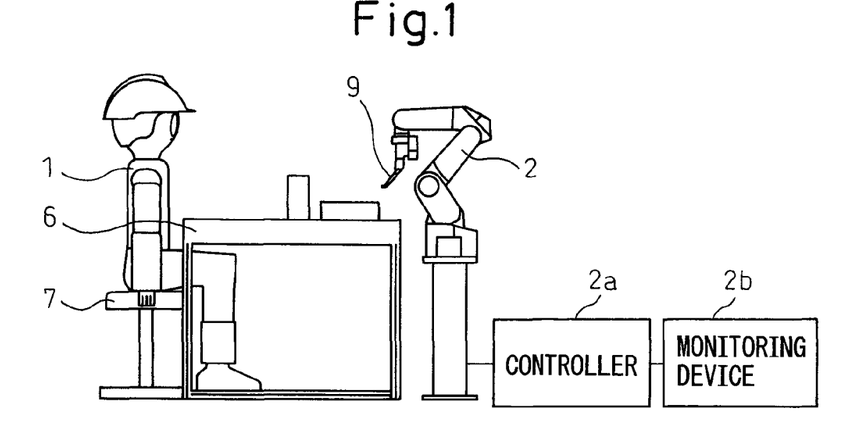
FIG. 1 is a side view of a production system according to a first embodiment of the present invention.

As shown in FIG. 1, in a production system according to a first embodiment, a working table 6 is arranged. A robot 2 is positioned at one side of working table 6. A seat 7 for an operator 1 is positioned at the other side of working table 6.

Although robot 2 is illustrated in FIG. 1 as a general multijoint robot having a component, such as a hand 9, capable of gripping a workpiece and/or a work tool, attached to the front end of the robot, robot 2 may be a robot having another conventional configuration. Since the detail of the robot does not directly relate to the present invention, explanation thereof is omitted. Robot 2 has a controller 2a, which controls a driving part of robot 2 such as a drive motor of a link mechanism, so as to control the motion of robot 2.

In any case, robot 2 is adapted to perform a task such as processing and/or transferring a workpiece on or above working table 6. A movement range of robot 2 is defined so that the movement range does not entirely cover an area on working table 6. In this regard, the "movement range" of robot 2 means a physical reachable area of any component of robot 2. For example, the reachable area may be determined by the size of an arm and/or hand 9 constituting robot 2, and a rotatable range of a link mechanism which connects the arm and/or hand 9 to robot 2. The movement of robot 2 may be determined by limiting a movement range of the link mechanism by means of a stopper or the like. The component of robot 2 may include an object, such as a workpiece and/or a work tool gripped by hand 9, which is moved together with the robot arm.

Also, a reachable area of a hand of operator 1 sitting on seat 7 does not entirely cover the area on working table 6. Since the area of working table 6 is sufficiently large so that the reachable area of the hand of operator is limited on working table 6 when operator 1 performs a task while sitting on seat 7. In other words, the reachable range of operator 1 is limited around robot 2, due to working table 6 and seat 7.

Figure 2A:
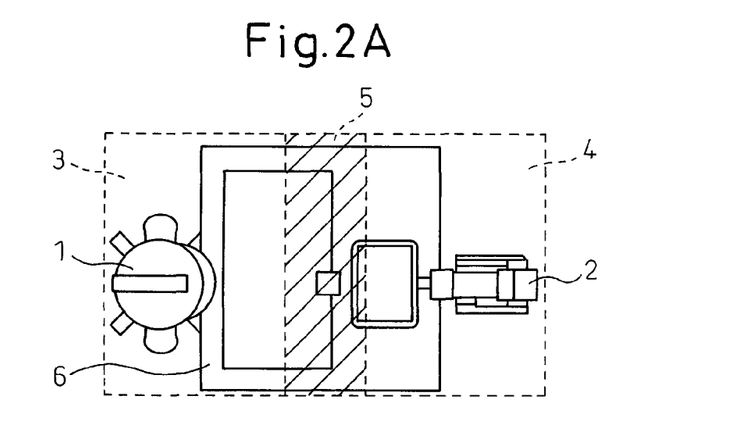
FIGS. 2A and 2B are respectively top and side views of an operator task area, a robot task area and a cooperative task area in the production system of FIG. 1.
Figure 2B:
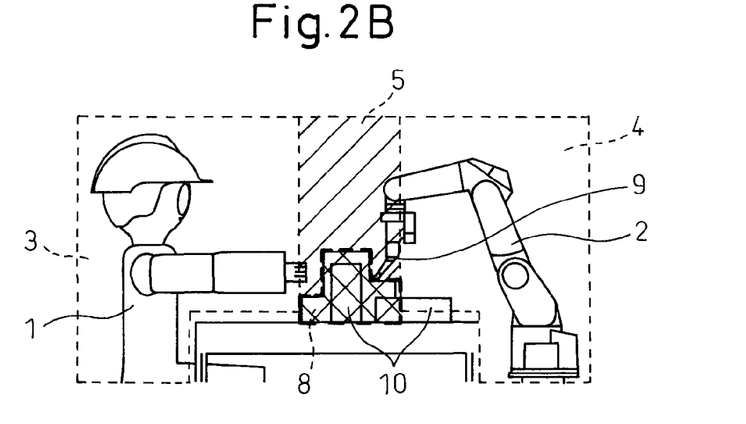

As such, as shown in FIGS. 2A and 2B, the area of working table 6 are divided into three areas, i.e., an operator task area 3, a robot task area 4 and a cooperative task area 5. Operator task area 3 is defined out of the reachable area of robot 2, and thus any component of robot 2 cannot enter area 3, regardless of the operation status of robot 2, whereby only operator 1 may exist in area 3. Robot task area 4 is defined so that operator 1 sitting on seat 7 cannot reach area 4, whereby only robot 2 may exist in area 4. Cooperative task area 5 is defined between areas 3 and 4, where both operator 1 and robot 2 may enter. Although each area is illustrated as a rectangular parallelepiped, each area may be defined as a complicated shape having a curved surface.

In the production system of the first embodiment, since both operator 1 and robot 2 may enter cooperative task area 5, robot 2 may interfere with operator 1. Therefore, the maximum movement speed of the component of robot 2 in area 5 is limited to lower than the maximum movement speed in robot task area 4. In other words, the maximum movement speed is not limited in robot task area 4. Due to this, operator 1 can take avoidance behavior when robot 2 may collide with operator 1. Further, even when robot 2 collides with operator 1, robot 2 does not cause an injury to operator 1.

The maximum movement speed of robot 2 in cooperative task area 5 is set to 250 mm/s, for example, which is specified in ISO 10218-1 regarding low speed control, the maximum speed may be set to a speed lower than 250 mm/s.

Figure 3:
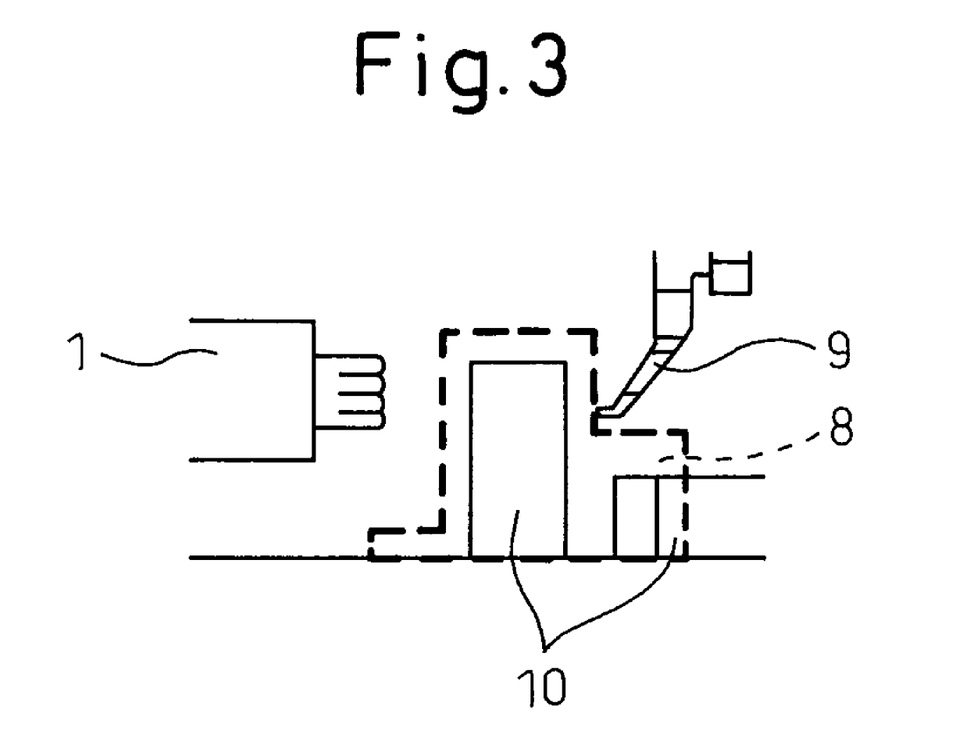
FIG. 3 is an enlarged view of a robot entry-prohibited area in the cooperative task area as shown in FIG. 2B.

In cooperative task area 5, in order that a part of operator 1 is not caught between the component of robot 2 and a peripheral object, such as working table 6, a robot entry-prohibited area 8 is defined as an area, the boundary of which is separated from the peripheral object by a predetermined distance or less. As shown in FIG. 3, when a member 10 such as a jig or a workpiece is positioned on working table 6, a robot entry-prohibited area 8 is also defined as an area, the boundary of which is separated from member 10 by a predetermined distance or less. As such, the peripheral object is an object positioned within or near the reachable area of robot 2, and operator 1 may be caught between robot 2 and the peripheral object.

Limiting the maximum movement speed of robot 2 in cooperative task area 5 and entering of robot 2 into robot entry-prohibited area 8 may be realized by software of controller 2a. Generally, controller 2a acquires information, such as the position of each drive motor, for controlling robot 2. Due to the information, controller 2a may judge whether the component of robot 2 enters cooperative task area 5 or not. When the component of robot 2 enters cooperative task area 5, controller 2a adjusts the motion of each driving part of robot 2 so that the speed of the component entering area 5 does not exceed a maximum speed which is predetermined at a relatively low value.

Generally, controller 2a also acquires information regarding the positions of working table 6 and the peripheral object, such as member 10 in order to control robot 2. Due to the information, controller 2a may automatically set robot entry-prohibited area 8 and adjust the motion of each driving part of robot 2 so that the component of robot 2 does not enter robot entry-prohibited area 8. Otherwise, the operator may predetermine robot entry-prohibited area 8 when the operator teaches the robot the working process or the like.

In addition, a monitoring device 2b may be employed, which is configured to stop robot 2 when the speed of the component of robot 2 in cooperative task area 5 exceeds a predetermined maximum speed, or when the component of robot 2 enters robot entry-prohibited area 8. Monitoring device 2b may be used to monitor the position and/or the speed of the component of robot 2 based on information obtained from controller 2a and/or an encoder of each driving part of robot 2. Otherwise, monitoring device 2b may monitor the position and/or the speed of the component of robot 2 by measuring the position and/or speed of a certain part of robot 2 and the peripheral object, by means of a camera or an optical tracking sensor, etc. Further, monitoring device 2b may command robot 2 to take avoidance behavior, reduce the speed of robot 2 or stop robot 2, when the speed of the component of robot 2 in cooperative task area 5 exceeds a predetermined maximum speed, or when tie component of robot 2 enters robot entry-prohibited area 8.

In particular, monitoring device 2b may be configured as a safety controller, which is more reliable than controller 2a, for the normal control. Otherwise, monitoring device 2b may be a function of software of controller 2a, which is different from the other function of software for the normal control of controller 2a.

Due to the production system according to the embodiment of the invention, operator 1 and robot 2 may simultaneously and cooperatively perform a task in cooperative task area 5. Therefore, for example, robot 2 can convey parts and/or a jig, required for the task of operator 1, to a place where operator 1 may reach. Further, for example, operator 1 may use robot 2 as a jig. In other words, operator 1 may process a workpiece while robot 2 holds the workpiece so that operator 1 can easily process the workpiece.

At this point, in the production system of the first embodiment, the maximum speed of robot 2 is limited in cooperative task area 5, and an area, the boundary of which is separated from peripheral object, such as working table 6 or member 10 by a predetermined distance or less, is determined as robot entry-prohibited area 8. Due to this, operator 1 is prevented from being injured by robot 2 or caught between robot 2 and the peripheral object. Since the motion of robot 2 is limited only within cooperative task area 5, the limitation may be minimized, whereby the production efficiency of the system may be highly maintained.

Second Embodiment

When it is not necessary that the operator and the robot perform a cooperative task, area 5 as described above may be defined as an area where only the operator or the robot may perform a task. In this case, the limitation of the maximum speed of the robot is not necessary, whereby the production efficiency of the system may be improved. However, since both the operator and the robot may enter area 5, it is necessary to avoid the serious collision between the operator and the robot within area 5. Hereinafter, a second embodiment for solving the problem is explained.

Figure 4A:
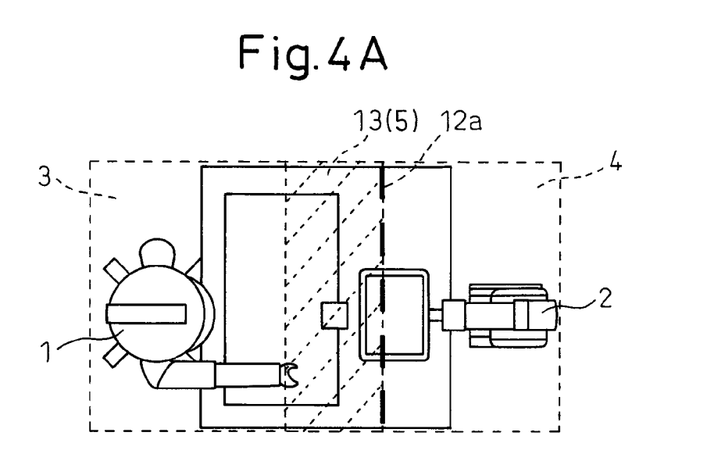
FIG. 4A is a front view of a production system according to a second embodiment of the invention, explaining an operation mode in which only an operator may perform a task in the cooperative task area.
Figure 4B:
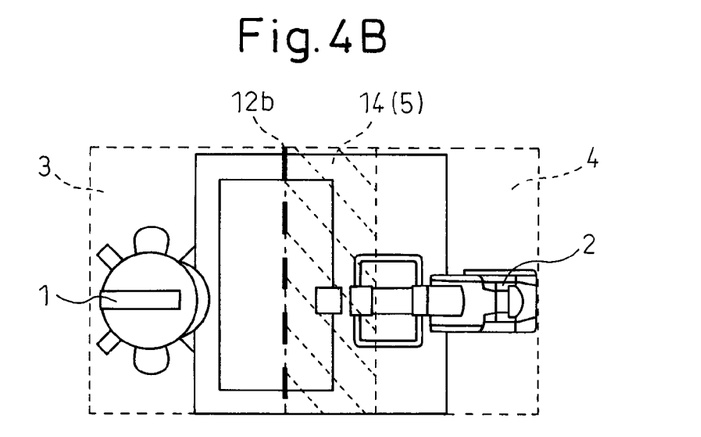
FIG. 4B is a front view of the production system according to the second embodiment of the invention, explaining an operation mode in which only a robot may perform a task in the cooperative task area.
Figure 4C:
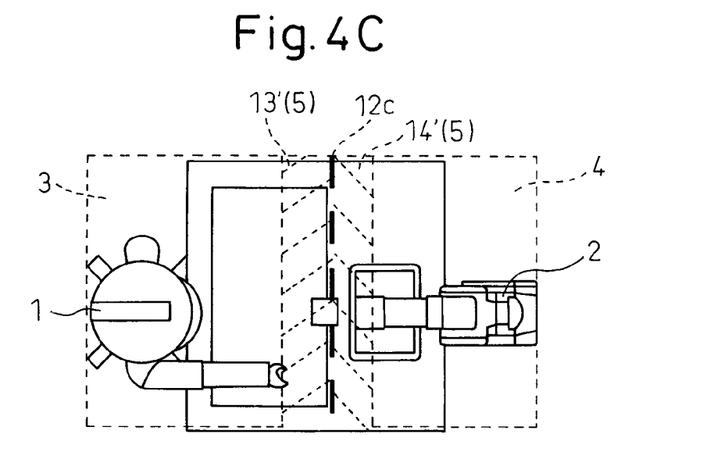
FIG. 4C is a front view of the production system according to the second embodiment of the invention, explaining an operation mode in which the cooperative task area is divided into an area where only the operator may perform a task and another area where only the robot may perform a task.

The second embodiment as shown in FIG. 4 is a modification of the first embodiment. In FIG. 4, each element similar to that of FIG. 1 has the same reference numeral. Further, some of components of a production system similar to those of FIG. 1 are not illustrated, and a detailed explanation thereof is omitted.

In a production system of the second embodiment, depending on the situation, cooperative task area 5 is used as an area where only operator 1 may exist or an area where only robot 2 may exist, by switching operation mode. Therefore, the second embodiment utilizes detection signals from first, second and third sensors 12a, 12b and 12c, such as photoelectric sensors.

Each of photoelectric sensors 12a, 12b and 12c is adapted to generate a light beam along a predetermined boundary, and detect that operator 1 or robot 2 crosses over the boundary by sensing that the light beam is blocked by operator 1 or robot 2. FIGS. 4A, 4B and 4C schematically show boundary defined by photoelectric sensors 12a, 12b and 12c, respectively.

FIG. 4A indicates a first operation mode wherein cooperative task area 5 is determined as an area 13 where only operator 1 may exist or perform a task. In this case, controller 2a controls the motion of robot 2 so that the component of robot 2 does not enter area 13.

In the first operation mode of FIG. 4A, first photoelectric sensor 12a, positioned in the boundary between area 13 and robot task area 4, may be used. By using a signal from photoelectric sensor 12a, monitoring device 2b may stop or decelerate robot 2 when robot 2 passes through the boundary in relation to photoelectric sensor 12a. Due to this, the safety of operator 1 in area 13 may be improved.

FIG. 4B indicates a second operation mode wherein cooperative task area 5 is determined as an area 14 where only robot 2 may exist or perform a task. In this case, controller 2a of robot 2 cancels the limitation of the maximum speed of robot 2 in cooperative task area 5 and/or the entering limitation in relation to robot entry-prohibited area 8. Due to this, since the cooperative task is not necessary, the performance of robot 2 may be maximized and the production efficiency of the system may be improved.

In the second operation mode of FIG. 4B, photoelectric sensor 12b, positioned in the boundary between area 14 and operator task area 3, may be used. By using a signal from second photoelectric sensor 12b, monitoring device 2b may stop or decelerate robot 2 when operator 1 passes through the boundary in relation to photoelectric sensor 12b. Due to this, the safety of operator 1 may be improved by avoiding or reducing impact between operator 1 and robot 2, if operator 1 carelessly enters area 14 where robot 2 may be performing a task.

FIG. 4C indicates a third operation mode wherein cooperative task area 5 is divided into two areas, i.e., an area 13' on the side of operator task area 3, where only operator 1 may exist or perform a task, and an area 14' on the side of robot task area 4, where only robot 2 may exist or perform a task. Two areas 13' and 14' may be defined by an arbitrary boundary. In this case, controller 2a controls the motion of robot 2 so that the component of robot 2 does not enter area 13'. Further, controller 2a cancels the limitation of the maximum speed of robot 2 and/or the entering limitation in relation to robot entry-prohibited area 8.

In the third operation mode of FIG. 4C, third photoelectric sensor 12c, positioned in the boundary between area 13' and area 14', may be used. By using a signal from photoelectric sensor 12c, monitoring device 2b may stop or decelerate robot 2 when operator 1 or robot 2 passes through the boundary in relation to photoelectric sensor 12c. Due to this, the safety of operator 1 may be improved by avoiding or reducing impact between operator 1 and robot 2.

It is preferable that photoelectric sensor 12a be used only when the first operation mode of FIG. 4A is set. Similarly, it is preferable that photoelectric sensor 12b be used only when the second operation mode of FIG. 4B is set, and that photoelectric sensor 12c be used only when the third operation mode of FIG. 4C is set. Depending on which photoelectric sensor is activated, operator 1 can determine where the reachable area of robot 2 is set. As a result, operator 1 can avoid entering the reachable area of robot 2.

In the second embodiment, switching of the operation modes, i.e., switching whether the cooperative task should be performed or not, and changing the boundary between the area where only the operator exists and the area where only the robot exists when the cooperative task is not performed, may be carried out by software of controller 2a, or if required, by switching the On/Off state of photoelectric sensors 12a, 12b and 12c. Therefore, even when the production system is activated, the operation mode can be rapidly switched. Due to this, the operation mode may be rapidly switched depending on the working process, whereby the production efficiency may be improved.

In the second embodiment, instead of the photoelectric sensor, a movable structure, and/or a camera or an optical tracking sensor arranged outside of the system may be used, so as to monitor the crossing over the boundary of operator 1 or robot 2. In this case, a lamp or the like may be used to indicate where the boundary between the operator task area and the robot task area is set. Further, the camera or the optical tracking sensor may be used to measure the positions of operator 1 and robot 2, and the measured data is transmitted to controller 2a and/or monitoring device 2b, in order to calculate the positional relationship between operator 1 and robot 2. Then, the safety of operator 1 can be secured by not letting robot 2 come into contact with operator 1, when operator 1 or robot 2 crosses over the boundary.

Third Embodiment

Figure 5:
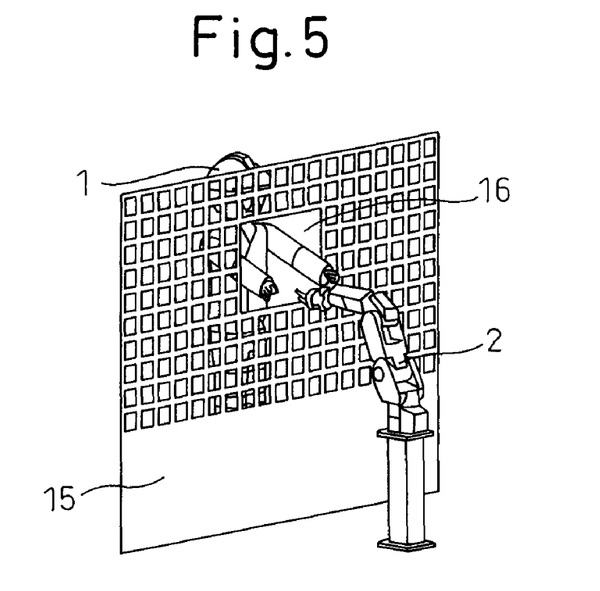
FIG. 5 is a perspective view of a production system according to a third embodiment of the present invention.
Figure 6:
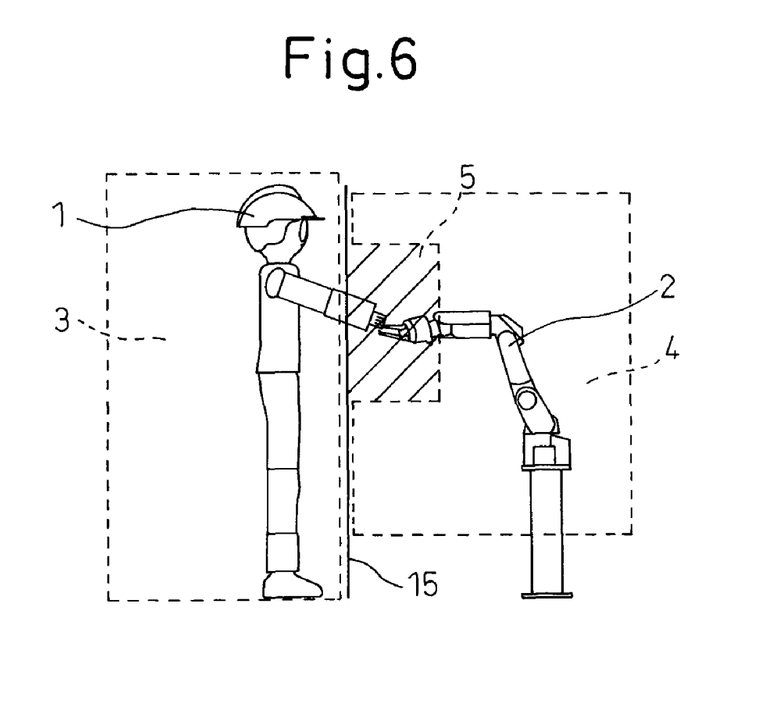
FIG. 6 is a side view of an operator task area, a robot task area and a cooperative task area in the production system of FIG. 5.
Figure 7:
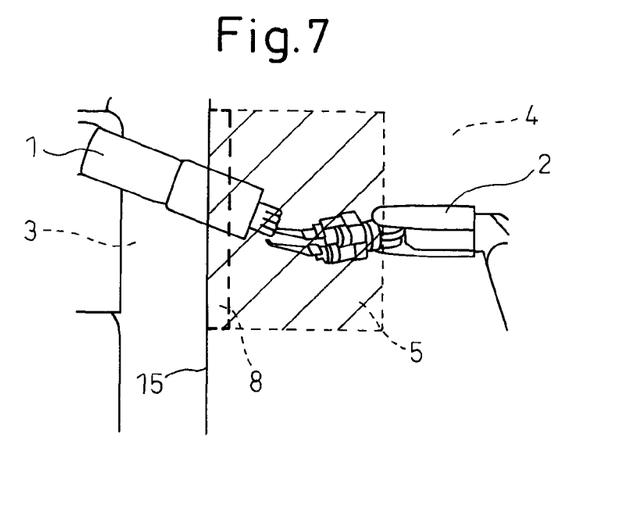
FIG. 7 is an enlarged view of a robot entry-prohibited area in the cooperative task area as shown in FIG. 6.

A third embodiment as shown in FIGS. 5 to 7 is a modification of the first embodiment. In FIGS. 5 to 7, each element similar to that of FIG. 1 has the same reference numeral. Further, some of components of a production system similar to those of FIG. 1 are not illustrated, and detailed explanation thereof is omitted.

In a production system according to the third embodiment, a safety fence 15, configured to limit an area where operator 1 can enter, is positioned between operator 1 and robot 2. Safety fence 15 has a window 16, whereby a hand of operator 1 can reach a robot side area where robot 2 is arranged through window 16.

As shown in FIG. 6, an operator side area in relation to safety fence 15 is determined as operator task area 3. The component of robot 4 is configured not to pass through window 16, by determining the size of the arm of the robot and/or limiting the movable range of the link mechanism of the robot.

On the robot side area in relation to safety fence 15, a reachable area of a hand of operator 1 after the hand passes through window 16, is determined as cooperative task area 5. A remaining area on the robot side area is determined as robot task area 4. In other words, operator 1 cannot enter robot task area 4 by means of safety fence 15. In cooperative task area 5, similarly to the first embodiment, the maximum speed of the component of robot 2 is limited by controller 2a and/or monitoring device 2b.

As shown in FIG. 7, in cooperative task area 5, an area the boundary of which is separated from safety fence 15 by a certain distance or less is determined as a robot entry-prohibited area 8. The component of robot 2 is prohibited from entering robot entry-prohibited area 8 by controller 2a and/or monitoring device 2b.

Also in the third embodiment, due to cooperative task area 5, operator 1 and robot 2 may simultaneously perform a task. In this regard, the maximum speed of the component of robot 2 is limited in cooperative task area 5. Further, an area, the boundary of which is separated from the peripheral member, such as safety fence 15 by a given distance or less, is determined as robot entry-prohibited area 8. Due to this, operator 1 can avoid collision with robot 2, and even when operator 1 collides with robot 2, operator 1 is not seriously injured, whereby the safety of operator 1 may be secured.

Fourth Embodiment

Figure 8A:
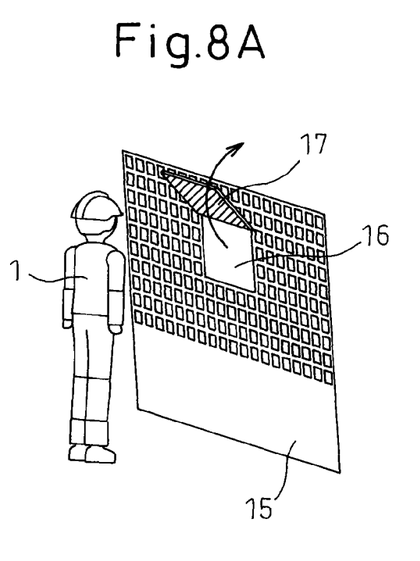
FIG. 8A is a perspective view of a production system according to a fourth embodiment of the invention, showing the state that a window of a safety fence is opened.
Figure 8B:
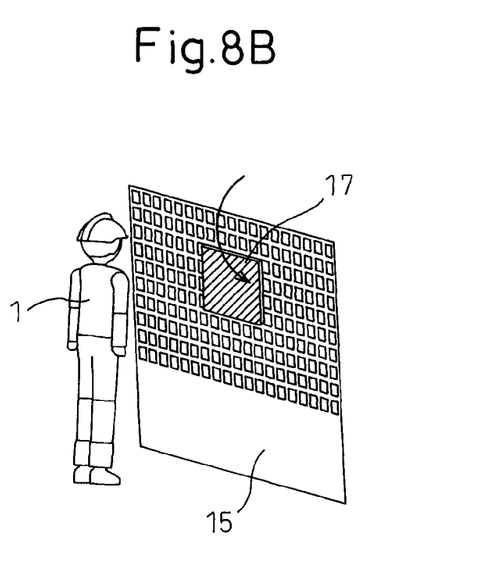
FIG. 8B is a perspective view of the production system according to the fourth embodiment of the invention, showing the state that the window of a safety fence is closed.

A fourth embodiment as shown in FIGS. 8A and 8B is a modification of the third embodiment. In FIGS. 8A and 8B, each element similar to that of the third embodiment has the same reference numeral. Further, some of components of a production system similar to those of the third embodiment are not illustrated, and a detailed explanation thereof is omitted.

In the fourth embodiment, a plate 17 configured to open/close window 16 is arranged. As shown in FIG. 8A, when plate 17 is opened, operator 1 and robot 2 may perform a cooperative task as described in the third embodiment.

On the other hand, in a process wherein the cooperative task is not necessary, plate 17 is closed as shown in FIG. 8B. Due to this, the entire area of the robot side in relation to safety fence 15 is determined as an area where operator cannot enter. In this case, a detection signal from a limit switch or the like, indicating whether plate 17 is opened or closed, is transmitted to controller 2a and/or monitoring device 2b. Then, when plate 17 is closed, the limitation of the maximum speed of the robot in cooperative task area 5, and the prohibition of entering robot entry-prohibited area 8 are deactivated. Therefore, when the cooperative task is not necessary, the performance of robot 2 may be maximally utilized, whereby the production efficiency may be improved.

In FIGS. 8A and 8B, plate 17 is configured to be opened or closed by means of a rotatable hinge attached to an upper end of window 16. However, plate 17 may be configured to be opened or closed by means of a rotatable hinge attached to a left or right end of window 16. Otherwise, plate 17 may be configured to slidably opened or closed in the vertical or horizontal direction.

Instead of plate 17 configured to prohibit operator 1 from entering window 16 of safety fence 15, a photoelectric sensor or an optical tracking sensor may be used so as to detect that operator 1 passes through window 16 of safety fence 15. When operator 1 passes through window 16, robot 2 may be stopped, decelerated or commanded to take avoidance behavior.

Fifth Embodiment

A fifth embodiment as shown in FIGS. 9 to 12 is a modification of the first embodiment. In FIGS. 9 to 12, each element similar to that of the first embodiment has the same reference numeral. Further, some of components of the production system similar to those of the first embodiment are not illustrated, and detailed explanation thereof is omitted.

Figure 9:
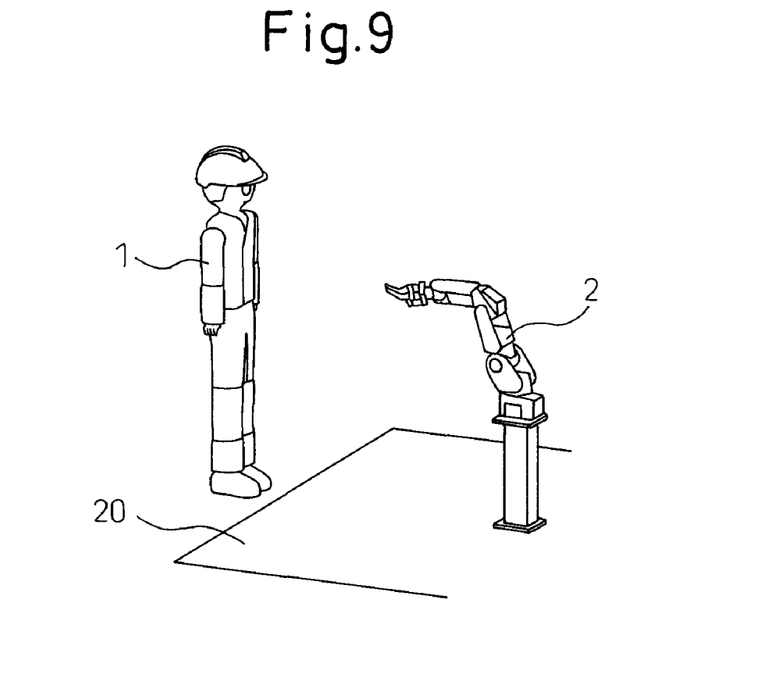
FIG. 9 is a perspective view of a production system according to a fifth embodiment of the present invention.

In the fifth embodiment, robot 2 is positioned on a safety mat 20. Safety mat 20 is configured to detect the weight of operator 1 when operator 1 stands on safety mat 20. A detection signal from safety mat 20 is input into controller 2a and/or monitoring device 2b. When operator 1 stands on safety mat 20, robot 2 is stopped or decelerated.

Operator 1 cannot approach robot 2 without standing on safety mat 20. Therefore, the reachable area of operator 1 during robot 2 is operated is limited to an area, the boundary of which is separated from the periphery of safety mat 20 by a given distance or less. On the other hand, the reachable area of robot 2 is limited to a certain area above safety mat 20 by means of a stopper or the like if required.

Figure 10:
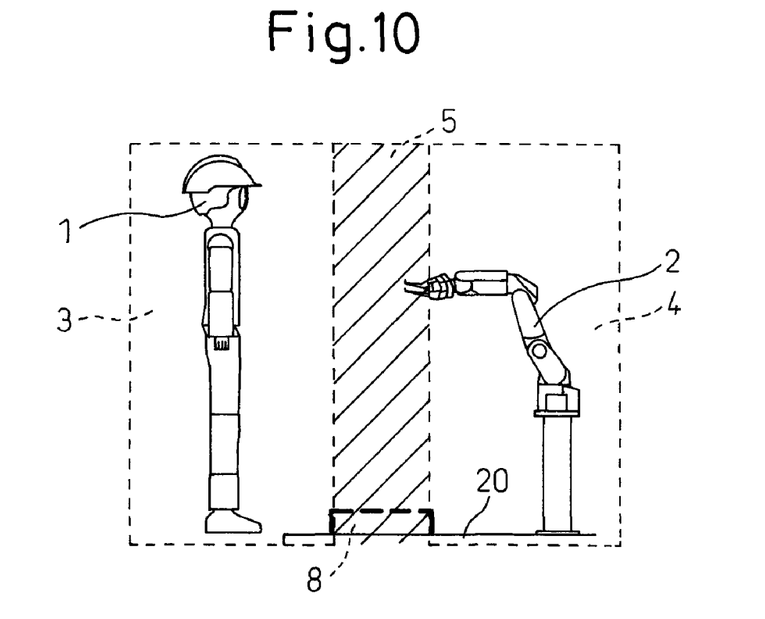
FIG. 10 is a side view of an operator task area, a robot task area and a cooperative task area in the production system of FIG. 9.

As such, in the fifth embodiment, as shown in FIG. 10, operator task area 3, robot task area 4 and cooperative task area 5 are defined. Similarly to the first embodiment, the maximum speed of robot 2 is limited in cooperative task area 5. Further, in cooperative task area 5, an area, the boundary of which is separated from safety mat 20 (or the peripheral member) by a given distance or less in the vertical upper direction, is defined as robot entry-prohibited area 8.

Also in the fifth embodiment, by defining cooperative task area 5, operator 1 and robot 2 may simultaneously perform a cooperative task. At this point, the maximum speed of robot 2 is limited in cooperative task area 5, and an area, the boundary of which is separated from the peripheral member such as safety mat 20 by a given distance or less, is defined as robot entry-prohibited area 8. Due to this, operator 1 can avoid collision with robot 2 and, even when operator 1 collides with robot 2, operator 1 is not seriously injured, whereby the safety of operator 1 may be secured.

Figure 11:
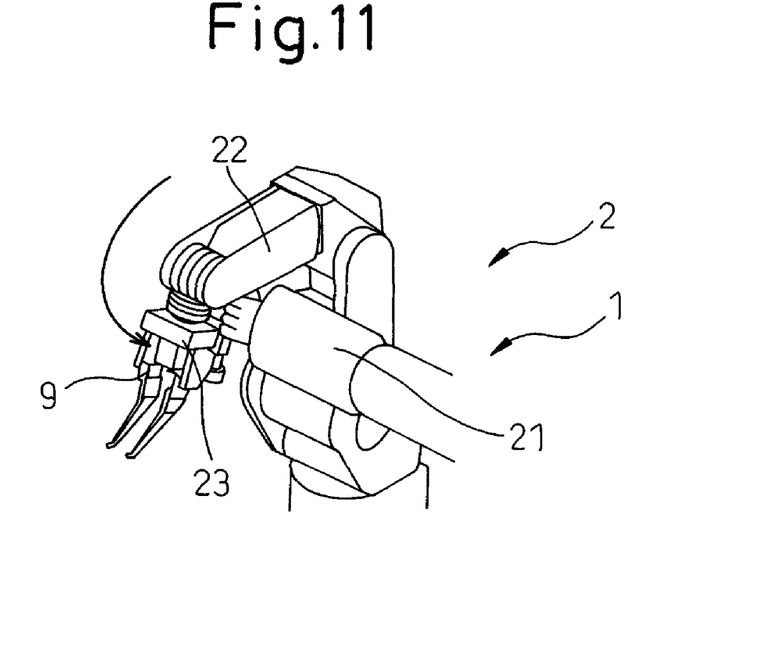
FIG. 11 is a perspective view explaining the limitation of movement range of the robot arm in the production system of FIG. 9.

In the fifth embodiment, depending on the size of safety mat 20, many components of robot 2 may enter cooperative task area 5. Then, as shown in FIG. 11, in the case that robot 2 has robot arms 22 and 23 configured to rotate relative to each other by means of a link mechanism of robot 2, and a junction of the two arms may enter cooperative task area 5, a relative angle between the two arms may be restricted so as not to fall below a certain angle. Due to this, a hand 21 of operator 1 may be prevented from being caught between robot arms 22 and 23.

The restriction of the relative angle between the two arms may be carried out by software of controller 2a and/or monitoring device 2b of robot 2, as well as the prohibition of entering robot entry-prohibited area 8. Alternatively, the motion of robot 2 may be limited by a stopper. Otherwise, a limit switch or a camera may be used in order to measure or monitor the relative angle, and robot 2 may be stopped when the monitored angle is below a certain value.

Figure 12:
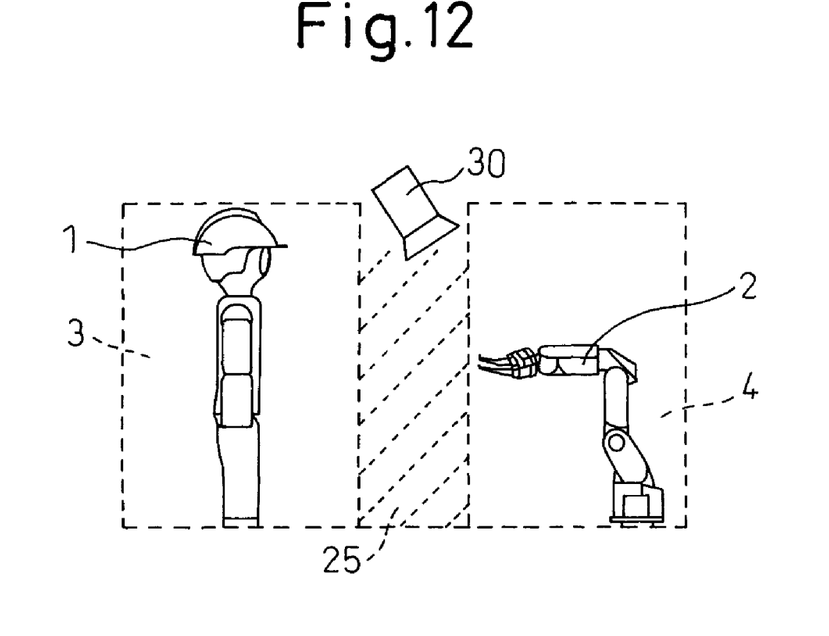
FIG. 12 is a side view explaining an operation mode in which the cooperative task area is utilized as an task area for the operator in the production system of FIG. 9.

Also in the fifth embodiment, as described in the second or fourth embodiment, when the cooperative task is not necessary, the limitation in cooperative task area 5 may be canceled. FIG. 12 shows an example wherein cooperative task area 5 is defined as an area 25 where only operator 1 may perform a task.

In the fifth embodiment, when operator 1 approaches robot 2 (concretely, enters cooperative task area 5) when the robot is in operation, the maximum speed of robot 2 may be limited lower than a reference maximum speed when operator 1 does not enter cooperative task area 5. In this regard, the reference maximum speed is the speed at which the performance of robot 2 may be maximized.

By means of controller 2a of robot 2, robot 2 may be controlled so as to perform a task only in robot task area 4, whereby cooperative task area 5 may be defined as area 25 where only operator 1 may perform a task. In this regard, a camera 30 may monitor robot 2 and robot 2 may be stopped, decelerated or commanded to take avoidance behavior when robot 2 enters area 25.

A plurality of cameras may be employed. For example, when operator 1 performs a task from a plurality of directions in relation to robot 2, a plurality of cameras 30 may be located at different positions so as to monitor robot 2 from the different directions. Similarly to the second embodiment, cooperative task area 5 may be defined as an area where only robot 2 may perform a task, or, may be divided into two areas, i.e., where only operator 1 may perform a task and where only robot 2 may perform a task. In addition, instead of camera 30, a photoelectric sensor may be used so as to monitor the robot, as described in the second embodiment.

Sixth Embodiment

Figure 13:
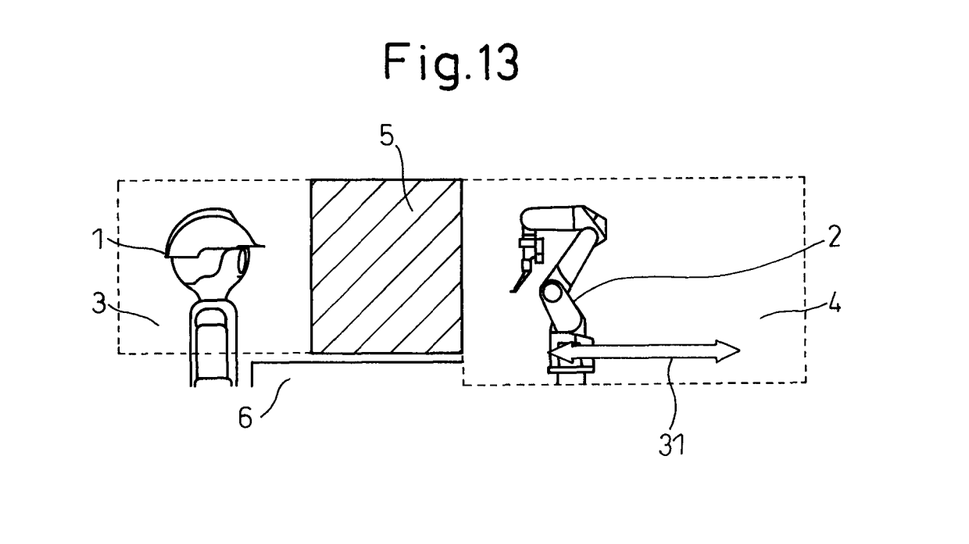
FIG. 13 is a side view of a production system according to a sixth embodiment of the present invention.
Figure 14:
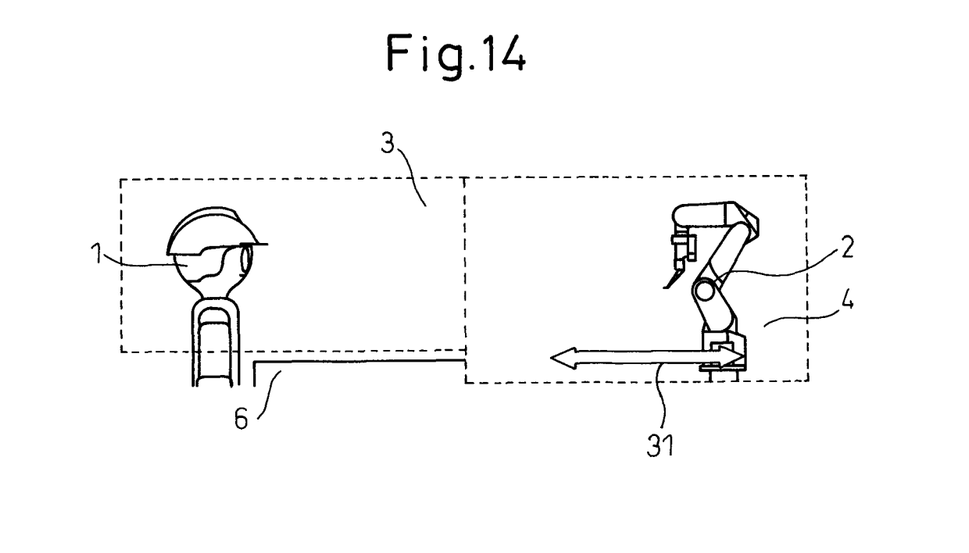
FIG. 14 is a side view showing the state in which the cooperative task area is switched as an area where only the operator performs a task.

A sixth embodiment as shown in FIGS. 13 and 14 is a modification of the first embodiment. In FIGS. 13 and 14, each element similar to that of the first embodiment has the same reference numeral. Further, some of components of the production system similar to those of the first embodiment are not illustrated, and detailed explanation thereof is omitted.

In the sixth embodiment, cooperative task area 5 is used as an area where only operator 1 may exist or an area where only robot 2 may exist, by switching operation mode. At this point, in order to define an area where only operator 1 may exist or perform a task, another means, different from the second embodiment, is used.

FIG. 13 shows a configuration, similar to FIG. 1, wherein working table 6 is positioned between operator 1 and robot 2, and operator task area 3, robot task area 4 and cooperative task area 5 are defined. Robot 2 has a self-propelled device or a traveling device, such as a traveling axis, and is movable in the direction along an arrow 31 as shown in FIG. 13. As shown in FIG. 14, when robot 2 is moved away from working table 6, robot 2 cannot enter cooperative task area 5. Controller 2a and/or monitoring device 2b may obtain information, from an encoder of the traveling axis, a camera or an optical tracking sensor arranged outside of the system, or a photoelectric sensor. Due to this, when robot 2 is away from working table 6, the operation mode may be changed so that cooperative task area 5 is used as operator task area 3. As such, the traveling device may limit entering of robot 2 into cooperative task area 5. Further, when robot 2 is moved to the position where the reachable area of the robot occupies a part of cooperative task area 5, cooperative task area 5 may be divided into an area where only operator 1 may perform a task and an area where only robot 2 may perform a task.

According to the present invention, an operator and a robot may simultaneously perform a task in the same area while ensuring the operator's safety.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A production system comprising:
   a robot;
   a peripheral object;
   a controller adapted to control the robot;
   an operator task area where an operator may enter and the robot cannot enter;
   a robot task area where the robot may enter and the operator cannot enter; and
   a cooperative task area, arranged between the operator task area and the robot task area, where both the operator and the robot may enter;
   and a robot entry-prohibited area being defined as an area having a boundary which is separated from the peripheral object by a predetermined distance or less, and arranged within the cooperative task area, and not within the robot task area,
   wherein the controller has a cooperation mode in which, when a component of the robot enters the cooperative task area, the maximum movement speed of the component of the robot is limited lower than when the component of the robot is outside the cooperative task area, or, when the operator enters the cooperative task area while the robot performs a task, the maximum movement speed of the component of the robot is limited lower than when the operator does not enter the cooperative task area, and, the motion of the robot is limited so that the component of the robot does not enter the robot entry-prohibited area in the cooperative task area, so that a part of the operator is not caught between the component of the robot and the peripheral object.

2. The production system as set forth in claim 1, further comprising a device adapted to stop the robot, in the cooperation mode, when the speed of the component of the robot exceeds a predetermined speed, or when the component of the robot enters the robot entry-prohibited area.

3. The production system as set forth in claim 1, wherein the controller comprises at least one of:
   a first operation mode, in which the component of the robot cannot enter the cooperative task area and only the operator may perform a task in the cooperative task area;
   a second operation mode, in which the maximum movement speed of the component of the robot in the cooperative task area is not limited, and the robot may enter the robot entry-prohibited area and only the robot may perform a task in the cooperative task area; and
   a third operation mode, in which the cooperative task area is divided into an area where only the operator may perform a task and an area where only the robot may perform a task.

4. The production system as set forth in claim 3, wherein the controller comprises at least the first operation mode, and wherein the production system further comprises a device adapted to stop the robot, reduce the speed of the robot or command the robot to take avoidance behavior when the robot enters the cooperative task area in the first operation mode, or a device adapted to limit entering of the robot into the cooperative task area in the first operation mode.

5. The production system as set forth in claim 3, wherein the controller comprises at least the second operation mode, and wherein the production system further comprises a device adapted to stop the robot, reduce the speed of the robot or command the robot to take avoidance behavior when the operator enters the cooperative task area in the second operation mode, or a device adapted to limit entering of the operator into the cooperative task area in the second operation mode.

6. The production system as set forth in claim 3, wherein the controller comprises at least the third operation mode, and wherein the production system further comprises a device adapted to stop the robot, reduce the speed of the robot or command the robot to take avoidance behavior when the operator enters the area where only the robot may enter in the third operation mode, or a device adapted to limit entering of the operator into the area where only the robot may enter in the third operation mode.

7. The production system as set forth in claim 3, wherein the controller comprises at last the third operation mode, and wherein the production system further comprises a device adapted to stop the robot, reduce the speed of the robot or command the robot to take avoidance behavior when the robot enters the area where only the operator may enter in the third operation mode, or a device adapted to limit entering of the robot into the area where only the operator may enter in the third operation mode.

8. The production system as set forth in claim 3, wherein the controller comprises the first, second and third operation modes, and wherein the production system further comprises:
   a first sensor adapted to detect that the robot has entered the cooperative task area in the first operation mode;
   a second sensor adapted to detect that the operator has entered the cooperative task area in the second operation mode; and
   a third sensor adapted to detect that the robot has entered the area where in the cooperative task area only the operator may perform a task or that the operator has entered the area where in the cooperative task area only the robot may perform a task in the third operation mode,
   wherein switching of the first, second and third operation modes is carried out by switching On/Off state of each of the first, second and third sensors.

9. The production system as set forth in claim 1, wherein the maximum movement speed of the component of the robot in the robot task area is not limited.

* * * * *